United States Patent [19]

Melbye

[11] Patent Number: 5,674,929
[45] Date of Patent: Oct. 7, 1997

[54] CEMENTITIOUS COMPOSITIONS FOR LAYERED APPLICATIONS

[75] Inventor: Tom Melbye, Zurich, Switzerland

[73] Assignee: MBT Holding AG, Zurich, Switzerland

[21] Appl. No.: 301,376

[22] Filed: Sep. 6, 1994

[30] Foreign Application Priority Data

Sep. 8, 1993 [GB] United Kingdom .................. 9318596
Nov. 15, 1993 [GB] United Kingdom .................. 9323520

[51] Int. Cl.$^6$ ........................................... C08K 5/06
[52] U.S. Cl. .................. 524/377; 524/4; 524/5; 524/6; 524/277; 524/322; 524/497; 524/488
[58] Field of Search ........................ 524/377, 277, 524/487, 488, 322, 4, 5, 6

[56] References Cited

U.S. PATENT DOCUMENTS

| | | | |
|---|---|---|---|
| 3,885,985 | 5/1975 | Serafin et al. | 106/315 |
| 4,144,207 | 3/1979 | Ohnsorg | 260/235 |
| 4,878,948 | 11/1989 | Shah | 106/90 |
| 4,961,790 | 10/1990 | Smith et al. | 106/823 |
| 5,179,170 | 1/1993 | Ohtsu et al. | 525/285 |
| 5,236,624 | 8/1993 | Lepert et al. | 252/314 |
| 5,294,256 | 3/1994 | Weigand et al. | 106/819 |

FOREIGN PATENT DOCUMENTS

| | | |
|---|---|---|
| 2671090 | of 1992 | France . |
| 0812025 | 4/1959 | United Kingdom . |
| 1411653 | 10/1975 | United Kingdom . |
| 1475708 | 6/1977 | United Kingdom . |
| 2027007 | 2/1980 | United Kingdom . |

*Primary Examiner*—Edward J. Cain
*Attorney, Agent, or Firm*—Carol A. Loeschorn; Andrew N. Parfomak

[57] ABSTRACT

The interlayer adhesion and final strength of cementitious compositions which are applied in consecutive layers are improved by the incorporation in the compositions of an admixture which is a combination of a waterproofing agent and a water retention agent. The invention is particularly applicable to sprayed concrete.

25 Claims, No Drawings

CEMENTITIOUS COMPOSITIONS FOR LAYERED APPLICATIONS

This invention relates to cementitious compositions, more particularly to cementitious compositions for application to substrates in consecutive layers, and most particularly to those which are applied by spraying, and to admixtures for use therein.

It is often required that a cementitious composition be applied in consecutive layers. The best known of such applications is the spraying of cementitious compositions such as "shotcrete", wherein a number of individual layers are applied by means of a shotcreting gun. One of the problems frequently encountered in such applications is cracking and shrinkage of the composition and bonding failures at the layer interfaces. The solution to this problem has hitherto been the application to the sprayed composition of a curing agent, that is, a preparation which is sprayed on the surface and which forms a film thereon. Typical examples include hydrocarbons, fatty acid salts and emulsions of paraffins or microwaxes. Because of the water loss at the surface of sprayed cementitious compositions, this must be done within a very short time of spraying—usually within 15–20 minutes. Moreover, before a further layer can be added, the curing agent must be removed, otherwise it may prevent adequate bonding between adjacent layers of sprayed composition. Various relatively easily-removable curing agents have been made and marketed, but they still involve the time-consuming work of application and removal.

It has now been discovered that certain admixtures can be added to cementitious compositions prior to layer application and that these compositions not only remove the necessity for the application and removal of curing agents, but they may also confer considerable property advantages on the compositions. The invention therefore provides an admixture for use in a cementitious composition, which comprises at least one concrete waterproofing agent and at least one water retention agent.

The invention further provides a fluid cementitious composition comprising an admixture as hereinbefore described.

The invention further provides a method of providing a solid mass of cementitious material by preparing a fluid cementitious composition as hereinabove described, placing it and causing it to harden.

The invention further provides a method for the application of a cementitious composition comprising the preparation and placement in consecutive layers of a composition as hereinabove described.

By "concrete waterproofing agent" is meant an agent of the type commonly used to render concrete waterproof. Such agents are well known to the art and are well described in, for example, "*Chemical Admixtures for Concrete*" by M. R. Nixon and N. P. Mailvaganan (2nd Ed. Spon, 1986) the contents whereof are incorporated herein by reference. Any of the typical examples described therein—microwaxes, stearates and other long chain fatty acids, e.g. oleic, caprylic and capric acids, etc.—may be used. Other materials include certain vegetable and animal fats, emulsions based on white grease, tallow or soya bean oil and paste products derived from petroleum residues including mineral oil, paraffin waxes and bitumen emulsions. In applications wherein the cementitious composition is applied in consecutive layers, such materials are normally applied to surfaces of cementitious compositions, and it is a surprising feature of this invention that the incorporation of such a material into an admixture as hereinabove described confers such advantageous results. It is possible to use more than one such material in an admixture according to the invention.

Particularly preferred concrete waterproofing materials are paraffin emulsions. By "paraffin emulsion" is meant an aqueous emulsion of a higher alkane having a fusion point above ambient temperature, which upon drying of the emulsion does not form a film in the sense that a paint forms a film (see also Römpp "Chemie Lexikon", 9th edition (Thieme Verlag 1989), volume 1, page 102, the contents of which are incorporated herein by reference). The emulsion may be stabilized by any convenient means, but it is preferable to use an anionically-emulsified paraffin mixture (fusion point of 45°–51° C.) with a particle size of less than 2μ. Examples of such paraffin emulsions are "Mobilcer" 55 or "Mulrex" 62 from Mobil and "Ubatol" FPG 860 from Cray Valley and "Tecol" BC 60/40 from Trüb Emulsion Chemie.

By "water retention agent" is meant a material which may be used to hold water within a cementitious composition or which promotes a better distribution of water throughout a cementitious composition. A group of preferred materials is that of the so-called "superabsorbent" materials. These superabsorbent materials, widely used in products such as diapers and incontinence pads, are usually based on polyacrylates, starch, polyethylene oxides, polyvinylalcohols or modified polysaccharides, e.g. acrylic-modified starch. These materials are readily available commercially, for example, the "SANWET®" series of superabsorbent polymers sold by Hoechst Celanese, Portsmouth, Va.; Sanyo Chemical Industries, LTD., Tokyo, Japan; and Hoechst Aktiengesellschaft, Federal Republic of Germany. The "SANWET®" series of polymers are of two major types, starch-grafted polyacrylates and starch-free polyacrylates. The preferred water retention agent is a water-soluble poly (alkylene oxide) ("PAO") of molecular weight from 100,000–8,000,000, determined by rheological measurements. The requirement that the PAO be water-soluble means that it must include at least a high proportion of oxyethylene units, i.e. sufficient oxyethylene units so that the PAO is water-soluble; it is preferable that it be pure poly(ethylene oxide). It is also preferable that the PAO molecular weight lie in the range 2,000,000–5,000,000. Typical commercial products useful in the working of this invention may be found, for example, in the "POLYOX®" series of water-soluble resins available from Union Carbide Chemicals and Plastics Company, Inc.

In a further embodiment of the invention, the admixture may additionally comprise a plasticizer or superplasticizer which is free from a β-naphthalene sulfonate-formaldehyde condensate ("BNS").

The plasticizer or superplasticizer useful in the present invention (and which may be added to the cementitious composition separate from or in any combination with the water retention and waterproofing agents) may be selected from the very wide range of such materials known to and used by the art, typical examples including lignosulfonates, hydroxycarboxylic acids, carbohydrates, melamine-formaldehyde condensates and styrene-maleic anhydride copolymers. The last-named are especially preferred, and the most preferred of these are styrene-maleic anhydride-derived copolymers in free acid or salt form and selected from the group consisting of those having the following types and numbers of monomer units:

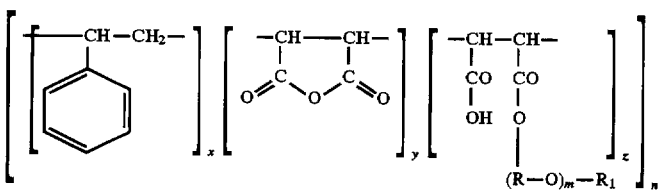

in which

R is an $C_{2-6}$ alkylene radical $R_1$ is a $C_{1-20}$alkyl-, $C_{6-9}$cycloalkyl- or phenyl group, x, y and z are numbers from 0.01 to 100 m is a number from 1 to 100 and n is a number from 10 to 100 with the provisos, that i) the ratio of x to (y+z) is from 1:10 to 10:1 inclusive,
ii) the ratio of z:y is from 3:1 to 100:1 and
iii) m+n=15–100 and those having the following types and numbers of monomer units:

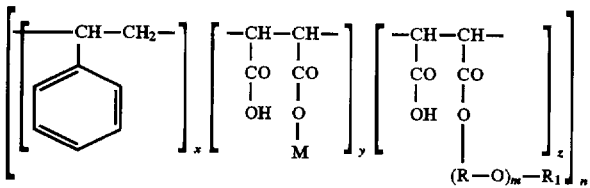

in which M is hydrogen or the residue of a hydrophobic polyalkylene glycol or polysiloxane, $R_1$, m and n are as hereinabove defined, x, y and z are numbers from 1 to 100 with the provisos that i) the ratio of x to (y+z) is from 1:10 to 10:1 inclusive,
ii) the ratio of z:y is from 5:1 to 100:1 and
iii) m+n=15–100.

These copolymers (hereinafter "SMA") are described in U. S. Pat. No. 5,158,996 and French Published Application 2 671 090 the contents of both being incorporated herein by reference.

The waterproofing agent and the water retention agent may be added individually to a cementitious composition but they are preferably added combined. The invention therefore provides an admixture for a cementitious composition which is a physical blend of a concrete waterproofing agent as hereinabove described and a water retention agent as hereinabove described, optionally with a plasticizer or superplasticizer as hereinabove defined, either combined with or separate from the other admixture materials.

The admixture is easily prepared and a skilled person will readily comprehend how this can be done. For example, when the water retention agent is poly(alkylene oxide), the poly(alkylene oxide) is first dissolved in water to give a solution of about 1–3% solids by weight and the concrete waterproofing agent is blended with the solution.

The relative proportions of the waterproofing agent and the water retention agent used in the admixtures of the invention, both to each other and to cementitious compositions in which they are incorporated, depend largely on the natures of the waterproofing agent and the cementitious composition, the use to which the cementitious composition will be put, the method of application, the desired slump properties, and so on. The skilled person can readily determine in each circumstance what are suitable proportions. As a general guide, the relative weight ratios of waterproofing agent to water retention agent are from 1:1 to 120:1, preferably from 20:1 to 25:1, and their combined presence is to the extent of from 0.5–5%, preferably of from 2.0–2.5% by weight of solids based on the weight of the cement. When a plasticizer or superplasticizer is used, it is present in the proportion of from 0.01 to 10%, preferably from 0.1 to 3% by weight based on the weight of the cement. When a plasticizer or superplasticizer is present, the proportion of admixture (waterproofing agent plus water retention agent plus plasticizer or superplasticizer) preferably does not exceed 5% by weight on cement.

In use, the waterproofing agent and water retention agent are added to a cementitious composition prior to end-use, usually (and preferably) at the mixing stage. The water retention agent and the waterproofing agent may be added to the mix consecutively in any order or concurrently, or, preferably, they may be pre-blended to form a curing admixture as hereinabove defined and added in this form. Similarly, the plasticizer or superplasticizer, when present, may be added combined or separately, again preferably at the mixing stage.

The invention is applicable to any cementitious composition, but is especially useful to those which need to be applied in consecutive layers which must bond to each other, be it mortar, concrete or grout. It can be used with normal concrete, repair concrete or wet or dry spraying concrete, but it is especially applicable to wet spraying.

It has been found that cementitious compositions used in accordance with this invention, perform outstandingly well. Not only is there no longer a necessity to apply and remove curing agent, but also shrinkage and cracking are reduced (in some cases completely eliminated), and cement hydration, bonding between layers of cementitious composition and 28-day strength are all enhanced.

In addition to waterproofing agent, water retention agent and plasticizer or superplasticizer, other art-recognized admixtures may be added in known quantities. One particularly useful admixture is accelerator, used when the cementitious composition is to be sprayed.

The method of this invention may be used in conjunction with the method described in PCT Published Application WO 94/02428, the contents whereof are incorporated herein by reference to give a spraying cementitious composition of outstanding applicability and final properties. The invention therefore provides a process of applying a cementitious composition to a substrate, comprising the steps of a) preparing a cementitious composition which comprises an admixture as hereinabove described, which admixture comprises a styrene-maleic anhydride copolymer superplasticizer (preferably as hereinabove defined), and sufficient water to provide suitable fluidity;

b) conveying this composition to a point of application at which point there is added β-naphthalene sulfonate-formaldehyde condensate; and c) applying the composition to the substrate.

The amount of fluidity required and the achievement thereof will vary depending on the individual circumstances and requirements, but the skilled person will readily be able to achieve the necessary fluidity.

This process works especially well when the application method is spraying and BNS is added to the composition at a spray nozzle. The invention further provides a slump control system for a cementitious composition, comprising an admixture as hereinabove defined and BNS together with instructions for their use.

The combination of SMA and BNS is described in PCT Published Application WO 94/02428. It permits the regulation of the slump of a cementitious composition. Slump, as measured by ASTM C143, is the oldest and most widely used measure of the workability of cementitious compositions. It has been found that a combination of SMA, BNS and concrete waterproofing agent gives good slump control. The performance is further enhanced by (a) the use the curing admixture as hereinabove defined, that is, by including a water retention agent as hereinabove defined, and (b) the use with the BNS of known accelerators. Especially efficacious types of accelerators are aluminates and silicates, particularly sodium silicate ("water glass"). The above-mentioned copending application describes a preferred BNS/water glass combination which works well in this invention.

The invention is further described with reference to the following examples in which all parts are expressed by weight.

EXAMPLES

Use of the invention in shotcrete spraying.

A spraying concrete mix is prepared by mixing the following ingredients:

| | |
|---|---|
| Portland cement | 450 parts |
| microsilica | 22 parts |
| styrene-maleic anhydride copolymer[1] | 6.75 parts |
| PEO/paraffin blend[2] | 8 parts |
| sand (0-8 mm) | 1590 parts |
| steel fibers (EE length 25-40 mm, diameter 0.5-0.6 mm) | 60 parts |

[1] As prepared in Example 1 of French Published Application 2671090
[2] A 50/50 volume blend of "Tecol" BC 60/40 aqueous paraffin emulsion (ex Trüb Emulsions Chemie AG) and an aqueous poly(alkylene oxide) solution of the following constitution

| | |
|---|---|
| WSR-301 (ex Union Carbide) | 1.0% by weight |
| MPEG-500 (ex Hoechst) | 2.0% by weight |
| water | 97.0% by weight |

This mixture is mixed, the order of mixing being, firstly, cement, microsilica sand and steel fibers, secondly styrene-maleic anhydride copolymer and finally the PEO/paraffin blend, and sufficient water is then added to give a water:cement ratio of 0.45. The slump of this mixture as measured by the method of ASTM C413 is 21 cm. The mixture is sprayed on to a substrate through a spray nozzle, there being injected into the mixture at the nozzle a solution of the following constitution:

| | |
|---|---|
| BNS sodium salt (40% aqueous solution) | 3% by weight on solids |
| sodium silicate (36% solution) | 30.6% by weight on solids |
| water | to 100% |

The injection rate is such that there is supplied 4% solution by weight of cement.

The sprayed concrete is allowed to harden and a further layer sprayed thereon.

For comparison, there is sprayed out the same composition with the following changes:

(a) the PEO/paraffin blend is omitted and the sand content is raised 8 parts;

(b) the 6.75 parts of SMA is replaced by 7.5 parts of BNS

The same water:cement ratio (0.45) is used, giving a slump of just over 20 cm. When sprayed, there is injected 4% on cement of an aqueous solution of a commercially-available silicate activator.

Two sprayings are carried out, one being subsequently covered by a curing agent ("Protect Weiss" ex Master Builders Technologies, applied at a rate of 0.4 kg. solids/$M^2$), the other being left uncured. A further layer is then applied to both, the curing agent being cleaned from that substrate which is coated thereon.

The interlayer bonding, density and 28 day compressive strength are measured and the results are as follows:

| | Bond strength (MPa) | Density | Compressive strength (MPa) |
|---|---|---|---|
| Composition according to the invention | >2.0 | 2.33 | 41–43 |
| Externally-cured composition | 0.7–1.2 | 2.28 | 38–40 |
| Uncured composition | <0.7 | 2.27 | 37 |

I claim:

1. An admixture for use in curing a cementitious composition, consisting essentially of one or more concrete waterproofing agents selected from the group consisting of a paraffin emulsion, mineral oil emulsion and bitumen emulsion, one or more water retention agents and optionally a plasticizer or superplasticizer which is free from β-naphthalene sulphonate-formaldehyde condensate, said waterproofing agent and said water retention agent being present in a weight ratio of from 1:1 to 120:1.

2. An admixture according to claim 1, wherein the water retention agent is a water-soluble poly(alkylene oxide) of molecular weight from 100,000 to 8,000,000.

3. An admixture for use in curing cementitious compositions, consisting essentially of one or more concrete waterproofing agents, one or more water retention agents and a plasticizer or superplasticizer comprising at least one styrene-maleic anhydride-derived copolymer in free acid or salt form and having the following types and numbers of monomer units:

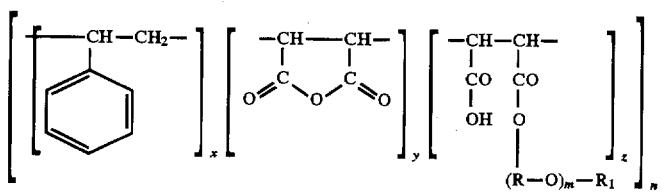

in which

R is an $C_{2-6}$alkylene radical $R_1$ is a $C_{1-20}$alkyl-, $C_{6-9}$cycloalkyl- or phenyl group, x, y and z are numbers from 0.01 to 100 m is a number from 1 to 100 and n is a number from 10 to 100 with the provisos, that i) the ratio of x to (y+z) is from 1:10 to 10:1 inclusive,
  ii) the ratio of z:y is from 3:1 to 100:1 and
  iii) m+n=15–100 and those having the following types and numbers of monomer units:

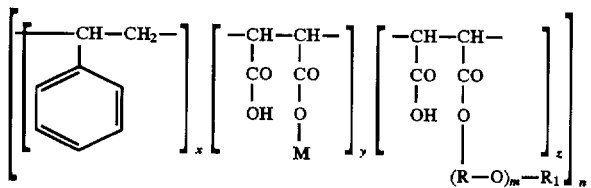

in which

M is hydrogen or the residue of a hydrophobic polyalkylene glycol or polysiloxane, $R_1$, m and n are as hereinabove defined x, y and z are numbers from 1 to 100 with the proviso that i) the ratio of x to (y+z) if from 1:10 to 10:1 inclusive,
  ii) the ratio of z:y is from 5:1 to 100:1 and
  iii) m+n=15–100.

4. A fluid cementitious composition, prepared by combining cement and at least one concrete waterproofing agent selected from the group consisting of a paraffin emulsion, mineral oil emulsion and bitumen emulsion, at least one water retention agent, and optionally a plasticizer or superplasticizer which is free from β-naphthalene sulphonate-formaldehyde condensate, said waterproofing agent and said water retention agent being combined in a weight ratio of from 1:1 to 120:1 with each other and in an amount of 0.01 to 10% by weight based on the weight of the cement.

5. A method for the application of a cementitious composition comprising preparing a cementitious composition by combining cement and an admixture and placing the cementitious composition in consecutive layers, wherein the admixture comprises at least one concrete waterproofing agent, at least one water retention agent, and optionally a plasticizer or superplasticizer which is free from β-naphthalene sulphonate-formaldehyde condensate, said waterproofing agent and said water retention agent being present in the admixture in a weight ratio of from 1:1 to 120:1 with each other, said admixture being present in an amount of 0.01 to 10% by weight based on the weight of the cement.

6. A process of applying a cementitious composition to a substrate, comprising the steps of a) preparing a cementitious composition by combining cement and, at least one concrete waterproofing agent, at least one water retention agent, a styrene-maleic anhydride copolymer superplasticizer, and sufficient water to provide suitable fluidity, said waterproofing agent and said water retention agent being combined in a weight ratio of from 1:1 to 120:1 with each other and in an amount of 0.01 to 10% by weight based on the weight of the cement;

b) conveying this composition to a point of application at which point there is added β-naphthalene sulfonate-formaldehyde condensate; and c) applying the composition to a substrate.

7. A method of providing a solid mass of cementitious material comprising the steps of preparing a fluid cementitious composition comprising combining cement and at least one concrete waterproofing agent, at least one water retention agent, and optionally a plasticizer or superplasticizer which is free from β-naphthalene sulphonate-formaldehyde condensate, placing the cementitious composition and causing the cementitious composition to harden, said waterproofing agent and said water retention agent combined in a weight ratio of from 1 to 120:1 with each other and in an amount of 0.01 to 10% by weight based on the weight of the cement.

8. An admixture according to claim 1 wherein said waterproofing agent is a paraffin emulsion.

9. An admixture according to claim 8 wherein said paraffin emulsion is an anionically-emulsified paraffin mixture with a particle size of less than 2μ.

10. An admixture according to claim 8 wherein said water retention agent is a water-soluble poly(alkylene oxide) of molecular weight from 100,000 to 8,000,000.

11. An admixture according to claim 10 wherein said water-soluble poly(alkylene oxide) has a molecular weight of from 2,000,000 to 5,000,000.

12. An admixture according to claim 2 wherein said water-soluble poly(alkylene oxide) has a molecular weight of from 2,000,000 to 5,000,000.

13. A method according to claim 5 wherein the water retention agent is a water-soluble poly(alkylene oxide) of molecular weight from 100,000 to 8,000,000.

14. A method according to claim 5 wherein said waterproofing agent is a paraffin emulsion.

15. A method according to claim 14 wherein said paraffin emulsion is an anionically-emulsified paraffin mixture with a particle size of less than 2 microns.

16. A method according to claim 14 wherein the water retention agent is a water-soluble poly(alkylene oxide) of molecular weight from 100,000 to 8,000,000.

17. A method according to claim 6 wherein the water retention agent is a water-soluble poly(alkylene oxide) of molecular weight from 100,000 to 8,000,000.

18. A method according to claim 6 wherein said waterproofing agent is a paraffin emulsion.

19. A method according to claim 18 wherein said paraffin emulsion is an anionically-emulsified paraffin mixture with a particle size of less than 2 microns.

20. A method according to claim 18 wherein the water retention agent is a water-soluble poly(alkylene oxide) of molecular weight from 100,000 to 8,000,000.

21. An admixture according to claim 3 wherein said waterproofing agent and said water retention agent are present in a weight ratio of from 1:1 to 120:1 with each other.

22. An admixture according to claim 3 wherein said waterproofing agent and said water retention agent are present in a weight ratio of from 20:1 to 25:1 with each other.

23. A fluid cementitious composition according to claim 4 wherein said waterproofing agent and said water retention agent are combined in a weight ratio of from 20:1 to 25:1 with each other.

24. A fluid cementitious composition according to claim 4 wherein said waterproofing agent and said water retention agent are combined in an amount of 0.1 to 3% by weight based on the weight of the cement.

25. A method for the application of a cementitious composition according to claim 5 wherein said waterproofing agent and said water retention agent are present in a weight ratio of from 20:1 to 25:1 with each other.

* * * * *

UNITED STATES PATENT AND TRADEMARK OFFICE
CERTIFICATE OF CORRECTION

PATENT NO. : 5,674,929
DATED : October 7, 1997
INVENTOR(S) : Tom Melbye

It is certified that error appears in the above-identified patent and that said Letters Patent is hereby corrected as shown below:

Column 8, line 32, delete "1" and insert --1:1--.

Signed and Sealed this

Twenty-third Day of December, 1997

Attest:

BRUCE LEHMAN

Attesting Officer

Commissioner of Patents and Trademarks